United States Patent [19]

Finger et al.

[11] Patent Number: 4,602,328

[45] Date of Patent: Jul. 22, 1986

[54] MANAGEMENT SYSTEM FOR THE MEMORY OF A PROCESSOR OR MICROPROCESSOR

[75] Inventors: Ulrich Finger, Clamart; Pierre Ligneres, Antony; Ciaran O'Donnell, Paris, all of France

[73] Assignees: L'Etat Francais represente par le Ministre des P.T.T. (Centre National d'Etudes des Telecommunications); Institut National de Recherche en Informatique et en Automatique, both of Paris, France

[21] Appl. No.: 450,668

[22] Filed: Dec. 17, 1982

[51] Int. Cl.[4] ............................................. G06F 12/10
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,279,014 | 7/1981 | Cassonnet | 364/200 |
| 4,300,192 | 11/1981 | Couleur | 364/200 |
| 4,356,549 | 10/1982 | Chueh | 364/200 |
| 4,376,297 | 3/1983 | Anderson | 364/200 |

OTHER PUBLICATIONS

The Journal "Computer", vol. 10, No. 5, May 1977, Longbeach, U.S.A.

"IBM Technical Disclosure Bulletin", vol. 18, No. 1, Jun. 1979.

*Primary Examiner*—James D. Thomas
*Assistant Examiner*—Florin Munteanu-Ramnic
*Attorney, Agent, or Firm*—Oblon, Fisher, Spivak, McClelland & Maier

[57] ABSTRACT

A system for the management of the physical memory of a processor which utilizes a base register which is loaded, for each virtual address of the memory, by a base address of a discriptive register corresponding to a task to be performed by the processor. This system utilizes a descriptive register table, an adder receiving the binary value of the base address of the first descriptive register, and the binary value of the index corresponding to the first register. The outputs of the adder address one of the inputs of the descriptive register table, thus selecting a segment descriptive register corresponding to the task to be performed. Each of the descriptive registers of the table contains control bits sent to the processor which makes it possible for the processor to check whether, for the segment to which the processor must have access, the processor must operate in the local or overall mode and whether the processor must process an input-output operation or an access to the memory.

6 Claims, 2 Drawing Figures

MANAGEMENT SYSTEM FOR THE MEMORY OF A PROCESSOR OR MICROPROCESSOR

BACKGROUND OF THE INVENTION

The present invention relates to a management system for the memory of a processor or microprocessor. It is applicable to the management of memories of processors or microprocessors of many different types, on the basis of the known segmentation and pagination concept.

It is known that processors and more particularly microprocessors at present reach very high processing performances. These performance levels mainly result from technological advances, but also from the development of systems making it possible to manage the memories and which reach very high capacities for reduced overall dimensions.

It is known that a management system for the memory of a processor or microprocessor is an interface located between the processor and the physical memory or memories associated therewith, said system managing the addressing of the memory. These memory management systems already exist in high power processors, but they require a large number of logic components.

In general, a memory management system is not used for a microprocessor or microcomputer, with which is associated a limited capacity memory (e.g. 64 K octets). Thus, in microprocessors or microcomputers, the addressable space is very small and the instruction code is not independent of the introduction or location of data in the memory.

However, memory address management is desirable in more modern microprocessors, which are associated with memories having a very large capacity (between 1 and 16 megaoctets). This management becomes indispensable when several processors or microprocessors are interconnected so as to form a multiprocessor system. In this case memory management systems make it possible to protect access to the respective memory zones of these processors.

Existing memory management systems essentially permit a dynamic allocation of the memories during the performance of programs, protection against certain access types (writing or reading), the detection of errors during addressing and the use of common memory zones by different users, without disturbing the operation of the processor. These systems use different management techniques, segmentation, pagination or a method combining both of these. Pagination uses memory spaces of the same size, called pages, whilst segmentation uses memory spaces of different sizes, called segments, whereby a segment can be contained within a page or can cover several pages.

In the pagination technique, the memory space seen by the user and the operation system is a linear space for which access to the memory takes place by a single logic number. In segmentation, access to the memory requires a pair of numbers (number of the segment and shifts or offset). The main advantage of pagination is due to the ease of allocating pages in the memories, because all these pages have the same size. However, it has a major disadvantage in that it requires a protection of the different spaces of the user memory, due to the linear character of the memory space. Segmentation does not lead to the same memory space protection problems, but it has the disadvantage of complicating the introduction and location of the segments in the memory space.

Methods combining pagination and segmentation have the advantages and disadvantages of each of the two methods. However, no matter what the management methods used, the known management systems are specific of the type of processor or microprocessor used. Thus, it is substantially impossible to use a memory management system supplied by one manufacturer with a processor or microprocessor supplied by another.

BRIEF SUMMARY OF THE INVENTION

The object of the invention is to obviate these disadvantages and more particularly to provide a memory management system for a processor or microprocessor, which is independent of the type of processor or microprocessor used. It also aims at obviating the disadvantages associated with pagination or segmentation methods. In particular, it makes it possible to separate the space reserved for input - output operations and the user memory space in the actual management system, without it being necessary to divide the addressable space of the common memory into two, as is the case with existing management systems. It also permits a separation of the local - common space in the actual management system. Thus, known management systems are designed for conventional monoprocessor structures and dynamic introduction into the local space is only possible by reserving a fixed space for all the local memories. This leads to an important complication for programming, as well as to a limitation of the addressable space. In these known management systems, it is consequently necessary to reserve a few bits for the local space. The present invention also permits the use of a large number of segmentation registers, whereas in the known management systems, the number of segmentation registers is limited. Moreover, when these systems control associative memories, the complexity of management does not make it possible to use a large number of segmentation registers. This leads to a very frequent reprogramming of the management systems or the use of several management systems in cascade.

In a more general manner, the management systems able to partly obviate the disadvantages referred to hereinbefore, are constructed with a very large number of integrated circuit boxes or cases. The distribution of the segments and the addressing flexibility are not used by the programming, because the memory management algorithms are too complex and, to obtain this flexibility, it is necessary to make the equipment much more complicated (adders for addressing processes), which limits the performance of the management systems, particularly due to the large number of adders, which make them lose their speed.

Thus, by means of a suitable technology, the invention aims at providing a management system having a reasonable number of circuits and which makes it possible to manage a large number of segmentation registers. These different objectives are achieved by combining in a special manner pagination and segmentation, this combination making it possible to obviate the use of large number of adders and comparators, which, in the known management systems, lead to complex operations.

Thus, the invention specifically relates to a system for the management of the physical memory of a processor, incorporating a table of segment descriptive registers connected to the processor and the means for transforming a virtual address supplied by the processor into a physical address in order to permit the performance of a task, on the basis of real pages and segments contained in a physical memory, said virtual address containing at least one virtual page number, the binary value of a checking index of the first descriptive register of a physical segment in the memory corresponding to a task to be performed, and the offset value of the start of the physical segment, with respect to the start of the corresponding real page, wherein it also comprises a base register which is loaded, for each virtual address, by the base address of the descriptive register corresponding to the task to be performed, said base address being supplied by the processor, the descriptive register table having inputs connected to the outputs of a logic adder, which receives on the one hand the binary value of the base address of the first descriptive register, and on the other hand the binary value of the index corresponding to this register, the output signals of the adder addressing one of the inputs of the descriptive register table.

According to another feature of the invention, the management system also comprises a control register loaded by a supervisor program registered in a memory of the processor, by binary values indicating the maximum number of descriptive registers used in the performance of the task, and a comparator connected to the processor and to the control register for comparing the binary values contained in the control register and the binary values of the index, said comparator applying an error signal to the processor, when the value of the index exceeds the number of descriptive registers involved in performing the task.

According to another characteristic of the invention, each descriptive register contains binary values relative at least to the base address of the physical segment, at the bottom of the page in which is contained the start of this segment, as well as binary values representing the size of the physical segment, the management system also comprising means for checking that the virtual page number does not exceed the size of the segment to be performed.

According to another feature, the management system also comprises means for forming the physical address of the page in which the start of the physical segment is located, on the basis of the virtual page number and the value of the base number of the physical page.

According to another feature, the means for checking that the virtual page number does not exceed the size of the segment are constituted by a logic AND constructed comparator.

According to another feature, the means for forming the page number in which the segment to be performed is located are constituted by an OR gate constructed adder.

According to another feature, the logic adder is of an OR gate construction.

BRIEF DESCRIPTION OF THE DRAWINGS

The invention is described in greater detail hereinafter relative to non-limitative embodiments and with respect to the attached drawings, wherein.

DETAILED DESCRIPTION OF THE PREFERRED EMBODIMENTS

Figure 1:
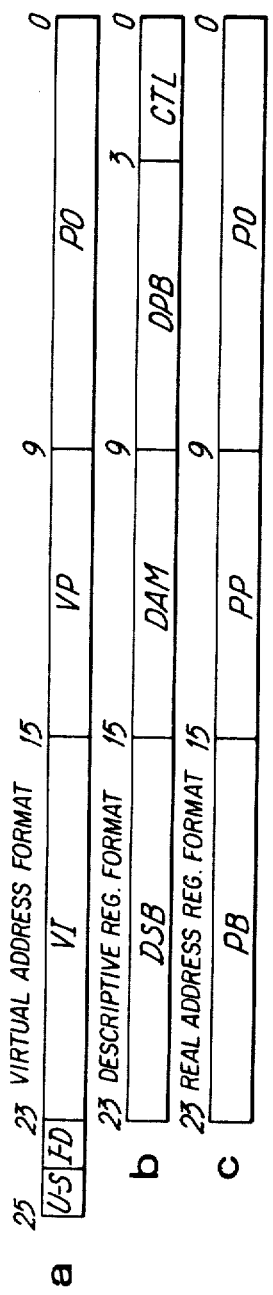
FIG. 1 shows the different registers and address formats involved in the system according to the invention.

FIG. 1 shows at (a) the format of the virtual address supplied by the processor, for addressing a physical memory, by means of the management system according to the invention and which will be described in greater detail hereinafter. This virtual address format comprises bits VP, which designate the number of the virtual page in which is located a segment containing instructions or data to which the processor wishes to have access for performing a given task. The bits VI correspond to the value of a checking index of a segment descriptive register containing all the information necessary for having access in a physical memory to a physical segment for performing the given task. The virtual address format also comprises bits PO relating to the displacement of the start of the physical segment, with respect to the start of the real or physical page in which it is located.

Finally, the virtual address format can also have bits U-S and I-D relative to the type of segment to which the processor wishes to have access in the physical memory. Bit U-S indicates that it is a segment of interest to the processor user or supervisor, whilst bit I-D indicates that it is an instruction or data segment in the physical memory. The digits represent the numbers of bits used in the virtual address format described hereinbefore. It is obvious that these numbers can differ.

FIG. 1 shows at (b), the format of one of the segment descriptive registers used in the management system according to the invention. This segment descriptive register comprises bits DPB relative to the base address of the page in which is located the start of the physical or real segment sought in the physical memory. It also contains bits DSB relating to the base address of the segment in this real page and bits DAM relating to the size of the segment to which the processor wishes to have access. This register also has control bits CTL making it possible for the processor to check whether, for the segment in question, it has to operate in a local mode or an overall mode, or whether it is a segment relating to input - output operations.

FIG. 1 shows at (c), the format of the real address register in which the management system according to the invention will arrange the bits relating to the physical address of the segment, to which the processor wishes to have access in the memory. This register firstly contains binary value $P_O$ of the displacement of the start of the segment relative to the start of the physical page in which it is located. This register also contains bits PB relating to the base address of the segment in the real or physical page. Finally, it contains bits PP relating to the physical page number in which the start of the sought segment is located. The digits indicate the numbers of bits involved in the register.

As will be shown in greater detail hereinafter, the segment descriptive registers form a table in the memory. In a special embodiment, this table is constituted by 1024 registers, each having 24 bits, whilst it has 256 inputs.

Figure 2:
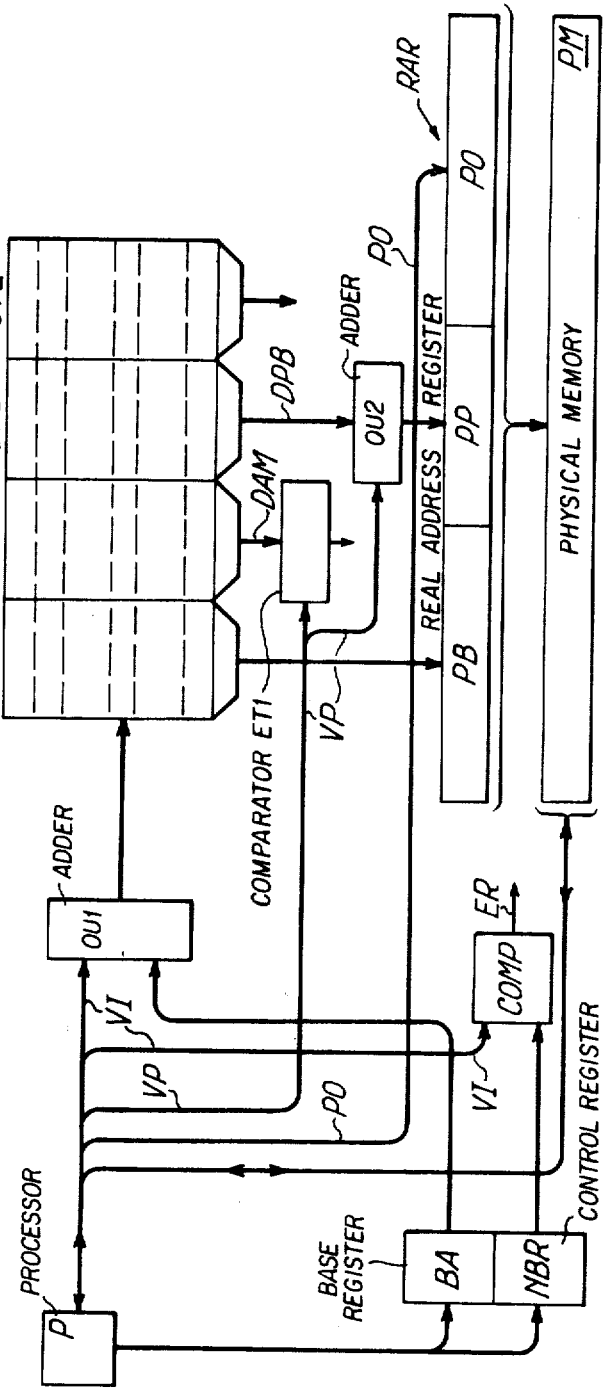
FIG. 2 shows diagrammatically a memory management system according to the invention.

FIG. 2 diagrammatically shows a system according to the invention, permitting the management of a physical memory PM of a processor P. This management makes it possible to have access to instructions or data contained in the physical memory, when the latter is subdivided into segments and real pages. Each segment can either be contained in a real page, or can contain several such pages. This access takes place from a virtual address supplied by the processor and whose format is given in FIG. 1a. The management system comprises a table T of segment descriptive registers and means which will be described in greater detail hereinafter for transforming a virtual address supplied by processor P into a physical address of a segment making it possible to perform a task. The management system also comprises a base register BA which is loaded, for each virtual address, by the base address of the first descriptive register corresponding to the task to be performed. This base address is supplied by the supervisor program of processor P. Table T of the descriptive registers has inputs, which are connected to the outputs of a logic adder OU1 receiving, on the one hand the binary value of the base address of the descriptive register contained in register BA and, on the other hand, the binary value of index VI of said register with respect to the base address. In this way, the addition of index VI to the base address of the descriptive register, contained in register BA, makes it possible to address one of the inputs of table T, in front of which is located the descriptive register of the segment relating to the task to be performed, or to address the first of the descriptive registers of the segments relating to this task.

The management system also comprises a control register NBR, loaded by the supervisor program of the processor P, by binary values indicating the maximum number of descriptive registers involved in table T, for performing the task in question. The outputs of this control register are connected to the inputs of the comparator COMP which also receives on other inputs, the binary values of index VI relating to the first descriptive register of the segment of the task to be performed. Comparator COMP supplies an error signal ER to processor P, when the value of index VI exceeds the number of descriptive registers involved in performing the task. Thus, it is probable in this case, that the value of the index contained in the virtual register supplied by the processor is erroneous.

When the addressing of the descriptive register of the segment relating to the task to be performed has taken place, the management system, which will be described in greater detail hereinafter, will operate in the following way. The least significant bits $P_O$ of the virtual address (bits 9–0) pass, without being changed, into a real address register RAR of the physical memory PM, which can thus be addressed as a result of known means (not shown). Bits DSB contained in the segment descriptive register and which indicates the base address of the real segment pass, without being modified, directly into the real address register RAR. These most significant bits are designated by PB here and in FIG. 1c. Before obtaining the number of the physical or real page PP in which is located the start of the real segment to be addressed, it is checked by the means constituted by the gate constructed comparator ET1, that the virtual address VP of the page in which the start of the segment to be addressed does not exceed the size DAM of the segment, said size being supplied by the bits contained in the aforementioned descriptive register. Thus, gate ET1 makes it possible to carry out the logic operation VP.DAM, which must be equal to 0, if the virtual page number does not exceed the size of the segment to be performed. Thus, if the virtual address exceeds the size of the segment to be performed, it is because an error has taken place in the addressing of the descriptive register. In this case, the binary value 0 supplied by the AND gate is applied to the processor to indicate this error. After this checking has taken place, the real page number PP in which is located the start of the segment to be addressed is formed by a logic adder OU2, on the basis of the base number of the physical page DPB and the number of the virtual page VP. Thus, adder OU2 performs the operation PP=VP+DPB. The real address register RAR then contains all the information necessary for addressing the real segment in physical memory PM. Thus, it contains the base address PB of the real segment, the physical page number PP in which the start of the segment is located and the displacement or offset PO of the start of said segment relative to the start of the physical page.

The operations described hereinbefore and which make it possible, on the one hand to check that the virtual page number is below the size of the real segment to be addressed, and on the other hand to calculate the real page number of the basis of this virtual page number and the base address of said real page, take place very rapidly due to logic adders and comparators. These known management systems use a large number of adders or comparators, which makes the operations complicated.

An example of address management performed in the system of the invention will now be described.

It is assumed that the processor supplies the following virtual address in a hexadecimal base: VI=segment 3−VP=page 10, (OAH)−PO (offset)=257 as well as the user bits U and data bits D.

It is assumed that the segment descriptive register for the user and data segment 3 contains the following bits:

DSB1, DAM=3OH, DPB=2OH expressed in a hexadecimal base.

After translation, the physical address is as follows:

PB1, PP=2AH, PO=257

The virtual address has been accepted, because the result of the operation is:

VP.DAM=3OH×OAH=0

The real page number PP is obtained by performing the sum VP+DPB=OAH+2OH=2AH in a hexadecimal base.

In the management system described hereinbefore, it is possible to extend the maximum size of the descriptive segments. In an embodiment, which is not shown here, the size of these descriptive segments is 32 bits. This extension of the size of the descriptive segments makes it possible to add supplementary control bits and in particular parity control bits.

The invention makes it possible to achieve the objectives referred to hereinbefore and in particular to provide a management system using a very small number of components. These logic components can all be easily integrated into a case or box. This system also makes it possible to separately manage the input - output spaces and the local - common spaces. Finally, it offers the possibility of managing the very large number of segmentation registers (1024) and which have very long segments (between 1K octet and 16M octets). The supervisor - user segments can be physically separated, in the same way as the instruction and data segments. This leads to an effective protection of the memory spaces, whilst the presence of a logic adder significantly reduces the response time of this system compared with known management systems (<100 ns).

Although the invention has been described hereinbefore with respect to a specific embodiment, the invention is obviously not limited thereto and variants are possible without passing beyond the scope of the invention.

What is claimed is:

1. A system for the management of the physical memory of a processor, incorporating a table of segment descriptive registers connected to the processor and to means for transforming a virtual address supplied by the processor into a physical address in order to permit the performance of a task, on the basis of real pages and segments contained in a physical memory, said virtual address containing at least one virtual page number, the binary value of a checking index of a first descriptive register of a physical segment in the memory corresponding to a task to be performed, and the offset value of the start of the physical segment, with respect to the start of the corresponding real page, wherein it also comprises a base register which is loaded, for each virtual address, by the base address of the first descriptive register corresponding to the task to be performed, said base address being supplied by the processor, the descriptive register table having inputs connected to the outputs of a logic adder, which receives on the one hand the binary value of the base address of the first descriptive register, and on the other hand the binary value of the index corresponding to the first descriptive register corresponding to the task to be performed, the outputs of the adder addressing one of the inputs of the descriptive register table, wherein the segment descriptive registers of the table contain control bits, the processor being enabled by the control bits of the segment to which the processor must have access, to check whether said processor must operate in the local or overall mode, and whether it must process an input - output operation, or an access to the memory.

2. A management system according to claim 1, further comprising:

a control register loaded by a supervisor program of the processor, by binary values indicating the maximum number of descriptive registers used in the performance of the task, and a comparator connected to the processor and to the control register for comparing the binary values of the index with the binary value in the control register, said comparator applying an error signal to the processor, when the value of the index exceeds the maximum number of descriptive registers involved in performing the task.

3. A management system according to claims 1 or 2, wherein each descriptive register contains binary values related to the base address of the physical segment, the base number of a real page in which is contained the start of this segment, as well as binary values representing the size of the physical segment, the management system also comprising means for checking that the virtual page number does not exceed the size of the segment to be performed.

4. A management system according to claim 3, wherein it also comprises means for forming the physical address of the page in which is located the start of the physical segment on the basis of the virtual page number and the value of the base number of a physical page.

5. A management system according to claim 3, wherein the means for checking that the virtual page number does not exceed the size of the segment are constituted by a AND constructed logic comparator.

6. A management system according to claim 4, wherein the means for forming the number of the page in which is located the segment to be performed are constituted by an OR logic constructed adder.

* * * * *